(12) United States Patent
Hoveida

(10) Patent No.: US 7,961,087 B2
(45) Date of Patent: Jun. 14, 2011

(54) HOLISTIC ALARM MONITORING

(76) Inventor: Bahman Hoveida, Medina, MN (US)

( * ) Notice: Subject to any disclaimer, the term of this patent is extended or adjusted under 35 U.S.C. 154(b) by 230 days.

(21) Appl. No.: 12/259,540

(22) Filed: Oct. 28, 2008

(65) Prior Publication Data

US 2010/0102982 A1    Apr. 29, 2010

(51) Int. Cl.
G08B 23/00    (2006.01)
G08B 29/00    (2006.01)
G05B 15/00    (2006.01)

(52) U.S. Cl. .......... 340/500; 340/506; 340/525; 700/17; 700/83

(58) Field of Classification Search .................... 340/500
See application file for complete search history.

(56) References Cited

U.S. PATENT DOCUMENTS

| | | | | |
|---|---|---|---|---|
| 6,542,075 B2 * | 4/2003 | Barker et al. | ................. | 340/506 |
| 6,690,274 B1 * | 2/2004 | Bristol | .......................... | 340/506 |
| 7,352,279 B2 * | 4/2008 | Yu et al. | ........................ | 340/517 |
| 2002/0163427 A1 * | 11/2002 | Eryurek et al. | ............... | 340/500 |
| 2003/0028536 A1 * | 2/2003 | Singh et al. | ..................... | 707/10 |

* cited by examiner

*Primary Examiner* — Donnie L Crosland
(74) *Attorney, Agent, or Firm* — Merchant & Gould PC

(57) ABSTRACT

Holistic alarm monitoring may be provided. An alarm display interface may receive alarm messages relating to assorted priorities and/or categories. Users may configure rules for displaying and processing the alarm messages as they are received. Historical alarm messages may be correlated and analyzed to determine trends, as by displaying the alarm messages on a calendar. Users may also configure and share alarm display views, search through received alarm messages, annotate and/or attach files to alarm messages, and categorize alarm messages.

20 Claims, 8 Drawing Sheets

| File | View | Actions | | | | |
|---|---|---|---|---|---|---|
| Pause Alarms | Acknowledge | Delete | Flag | Email | Filter | Choose Columns |

*Real Time Alerts*

*Unacknowledged*

| Summary | Date/Time | Origin | Description | Event |
|---|---|---|---|---|
| Unacknowledged | 09/15/08 | Belmont | RTU STAT #1 | Device Change of State |
| ⚠ Belmont | 09/15/08 | Berkeley | GT11 LOAD SELECT... | Email COS |
| ⚠ Berkeley | 09/15/08 | Portland | RTU STAT #1 | Device Change of State |
| ⚠ Portland | 09/15/08 | Berkeley | GT11 UNIT READY | Email COS |
| ⚠ Rockport | 09/15/08 | Portland | RTU STAT #4 | Device Change of State |
| ⚠ Sacramento | 09/15/08 | Rockport | RTU STAT #3 | Device Change of State |
| ⚠ San Juan | 09/15/08 | Belmont | RTU STAT #1 | Device Change of State |
| ⚠ Test Server | 09/15/08 | San Juan | GT9 CONTROL MOT... | Email COS |
| | 09/15/08 | Belmont | RTU STAT BRD #2 | Device Change of State |

Real Time Alerts

Historical Alarms

HOLISTIC ALARM MONITORING

BACKGROUND

A Supervisory Control And Data Acquisition (SCADA) system is an industrial control system for monitoring and controlling a process such as power flow on a power transmission and distribution system. In some situations, static displays may support operator interaction to monitor, view, and acknowledge alarms. For example, a system may allow an operator to view alarms categorized as Unacknowledged, Acknowledged, Major, or Minor. Thus, the conventional strategy is to present the most important alarms first, particularly in emergency situations when a large number of alarms are being generated. This often causes problems because the conventional strategy does not allow the operator the flexibility to quickly view alarms in a particular category or from a particular monitoring station. For example, the SCADA system may receive hundreds or thousands of alarms from multiple substations in a power system during a thunderstorm. In this situation, the operator operating the SCADA system may have no way to quickly sort the alarms by location so as to dispatch appropriate maintenance crews.

SUMMARY

Consistent with embodiments of the present invention, systems and methods are disclosed for holistic alarm monitoring. Holistic alarm monitoring may be provided. An alarm display interface may receive alarm messages relating to assorted priorities and/or categories. Users may configure rules for displaying and processing the alarm messages as they are received. Historical alarm messages may be correlated and analyzed to determine trends, as by displaying the alarm messages on a calendar. Users may also configure and share alarm display views, search through received alarm messages, annotate and/or attach files to alarm messages, and categorize alarm messages.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 6A-6C are screen shots illustrating an alarm display interface; and

FIG. 7 is a screenshot illustrating a calendar view for alarm analysis.

DETAILED DESCRIPTION

Figure 1:
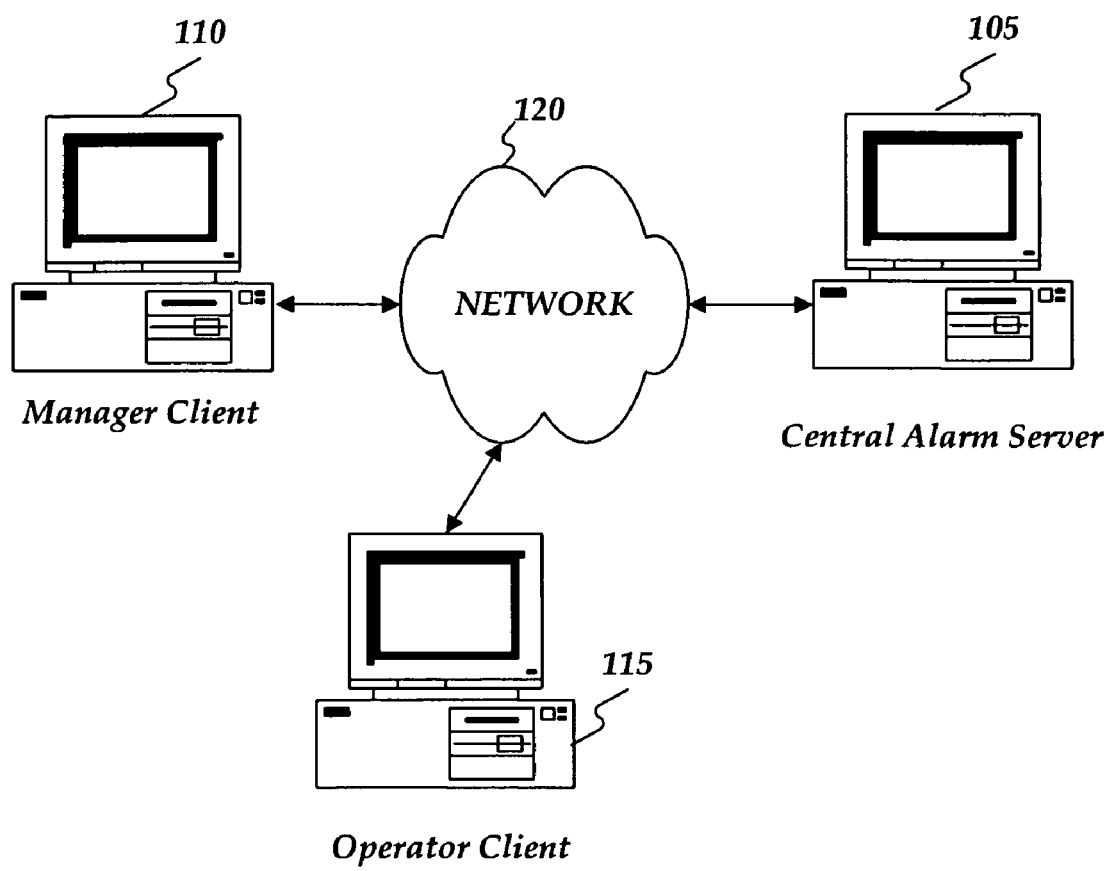
FIG. 1 is a block diagram of a client/server alarm system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments consistent with the invention may comprise a system for providing holistic alarm monitoring. The system may comprise memory storages for maintaining databases and processing units coupled to the memory storages. The processing units may be operative to send alarm messages. The alarm messages may comprise information and/or warnings about monitored systems and/or elements. The processing units may be further operative to receive and display the alarm messages. Moreover, the processing units may be operative to acknowledge the alarm messages. Furthermore, the processing units may be operative to process the alarm messages according to a set of rules. The set of rules may be configured to filter which alarm messages are displayed, sort messages into folders, and/or categorize alarm messages. Consistent with embodiments of the invention, an alarm display interface may be provided on a client system to receive and process alarm messages. For example, the client system may be configured to receive, process, and/or display Supervisory Control And Data Acquisition (SCADA) alarm messages.

Consistent with embodiments of the present invention, the aforementioned memories, processing units, and other components may be implemented in a system, such as an alarm monitoring system 100 of FIG. 1. Any suitable combination of hardware, software, and/or firmware may be used to implement the memories, processing units, or other components. By way of example, the memories, processing units, or other components may be implemented with a central alarm server 105, a manager client 110, and an operator client 115 in combination with system 100. Central alarm server 105, manager client 110, and operator client 115 may each be operated by separate entities. For example, manager client 110 may be operated by a manager employee monitoring overall performance at a facility. Central alarm server 105 may be operated by an entity responsible for receiving information from geographically distributed monitor stations. Operator client 115 may be operated by a line operator responsible for monitoring the status of, for example, a particular device, system, and/or facility.

As shown in FIG. 1, system 100 may also include a network 120. The aforementioned system and processors are exemplary and other systems and processors may comprise the aforementioned memories, processing units, or other components, consistent with embodiments of the present invention.

Figure 2:
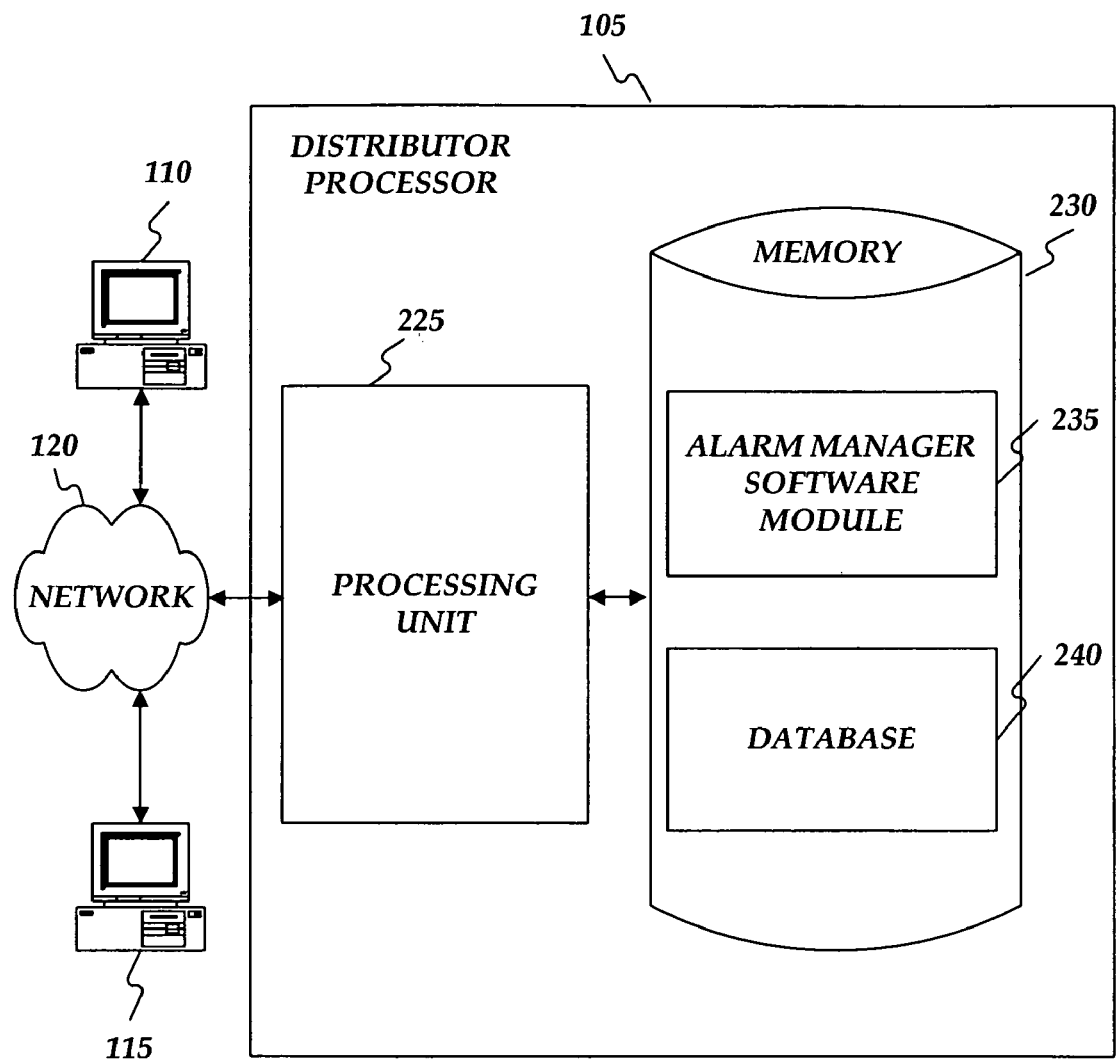
FIG. 2 is another block diagram of the client/server alarm system.

FIG. 2 shows distributor processor 105 of FIG. 1 in more detail. As shown in FIG. 2, central alarm server 105 may include a processing unit 225 and a memory 230. Memory 230 may include an alarm manager software module 235 and a database 240. Manager client 110 and operator client 115 may comprise a similar structure. While executing on processing unit 225, alarm manager software module 235 may perform processes for receiving and/or sending alarm messages, including, for example, one or more of method 400 and/or method 500 stages described below with respect to FIGS. 4 and 5. Furthermore, one or more of method 400 or method 500 stages may be performed by central alarm server 105, manager client 110, or operator client 115.

Central alarm server 105, manager client 110, or operator client 115 included in system 100 may be implemented using a personal computer, network computer, mainframe, or other similar microcomputer-based workstation. The processors may comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processors may comprise other systems or devices.

Network 120 may comprise, for example, a local area network (LAN) or a wide area network (WAN). Such networking environments are commonplace in offices, enterprise-wide computer networks, intranets, and the Internet. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802), a Bluetooth interface, another RF communication interface, and/or an optical interface.

System 100 may also transmit data by methods and processes other than, or in combination with, network 120. These methods and processes may include, but are not limited to, transferring data via, diskette, flash memory sticks, CD ROM, facsimile, conventional mail, an interactive voice response system (IVR), or via voice over a publicly switched telephone network.

Figure 3:
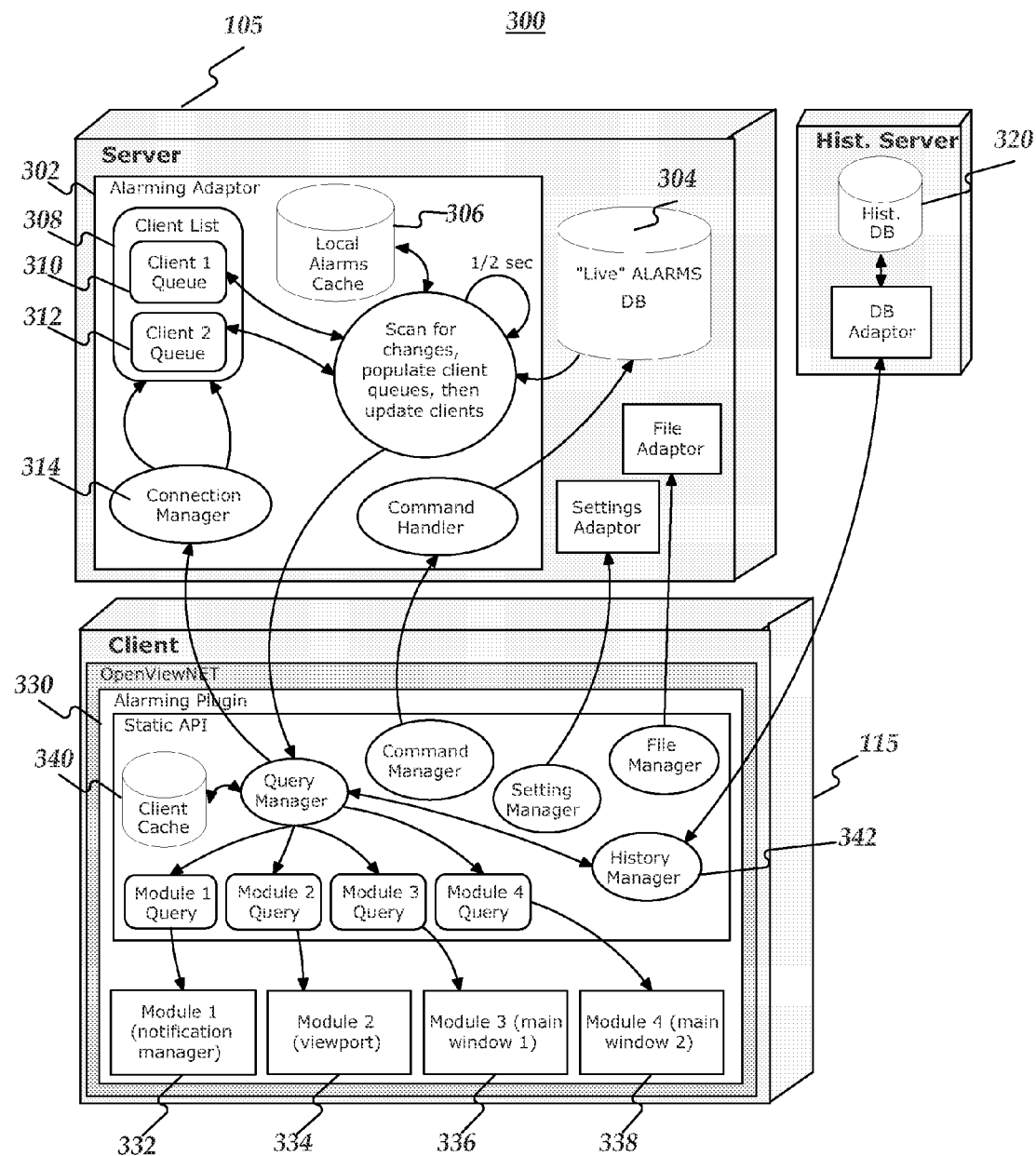
FIG. 3 is a block diagram of an alarm monitoring environment.

FIG. 3 is a block diagram of an alarm monitoring environment 300. Alarm server 105 may comprise an alarming adaptor 302 and an alarm database 304. At a configurable rate, which may default to 2 times per second, adaptor 302 may poll alarm database 304 looking for any changes that have occurred. To determine if changes have taken place, adaptor 302 may store a local copy of alarm database 304 as a local alarm cache 306 in the adaptor's memory and may compare local alarm cache 306 against the "live" database, alarm database 304. If any changes are found, the changes may be pushed out to clients such as manager client 110 and operator client 115 that need to be made aware of the changes. Adaptor 302 may further comprise a client list 308 including a first client queue 310 associated with manager client 110 and/or a second client queue 312 associated with operator client 115.

Adaptor 302 may also perform actions on alarms stored in alarm database 304. For example, adaptor 302 may acknowledge, update, and/or delete an alarm. Consistent with embodiments of the invention, adaptor 302 may only perform certain actions if the action request is associated with a user who has adequate permission. Consistent with further embodiments of the invention, adaptor 302 may perform an action on multiple alarms matching a particular condition. For example, a user with appropriate permission may acknowledge all unacknowledged alarms generated by a particular origin station.

Adaptor 302 may further comprise a connection manager 314 operative to receive connections from clients such as operator client 115. When a client connects to adaptor 302, the client may send a message specifying an alarm notification type to be sent. The possible notification types may include noise, desktop alert, widget, and plugin.

A viewport widget may comprise an abridged version of the alarm plugin and may comprise a tabular view displaying only the 5 newest (or oldest if configured as such) unacknowledged alarms. The widget may also contain a subset of tool buttons used to interact with the plugin's alarm display interface.

Sounds may be configurable based on alarm class. Noise type alarms may be capable of continuous and/or periodic play, as configured. Periodic play may be configurable with a maximum number of periods, and sound files may be shared among users and/or clients. Consistent with embodiments of the invention, the noise played will be that of the newest or most severe alarm in the current view. Noise enabling may be configurable on a user and client basis. Noise silencing may be permitted on all alarms in the alarm display interface and/or all old alarms up to the currently selected alarms. Noise snoozing may be permitted to temporarily turn off all noise for a configured period. The user may be able to unsnooze at any time. Snooze may be optionally enabled as a system-wide action, affecting all users currently logged in. Consistent with further embodiments of the invention, a visual indication of the state of alarm noise, such as a blinking/non-blinking button and/or alternating image, may be provided in the alarm display interface and/or the widget.

A desktop alert, similar to a new email desktop alert that is displayed in a separate alert window, may be displayed when a new unacknowledged alarm message is received from adaptor 302. Desktop alerts may be enabled on a user and/or severity basis with a duration of display and transparency configurable for each user.

Adaptor 302 may start sending all of the alarms matching the client's request to the client and may continue to update the client until the client sends a halt message or disconnects. A list of alarm records that have been sent to the client may be maintained by adaptor 302 in client list 308. When a new alarm is generated or an existing alarm is modified, the client alarm list may be updated and the alarm may be pushed out to the client.

Figure 4:
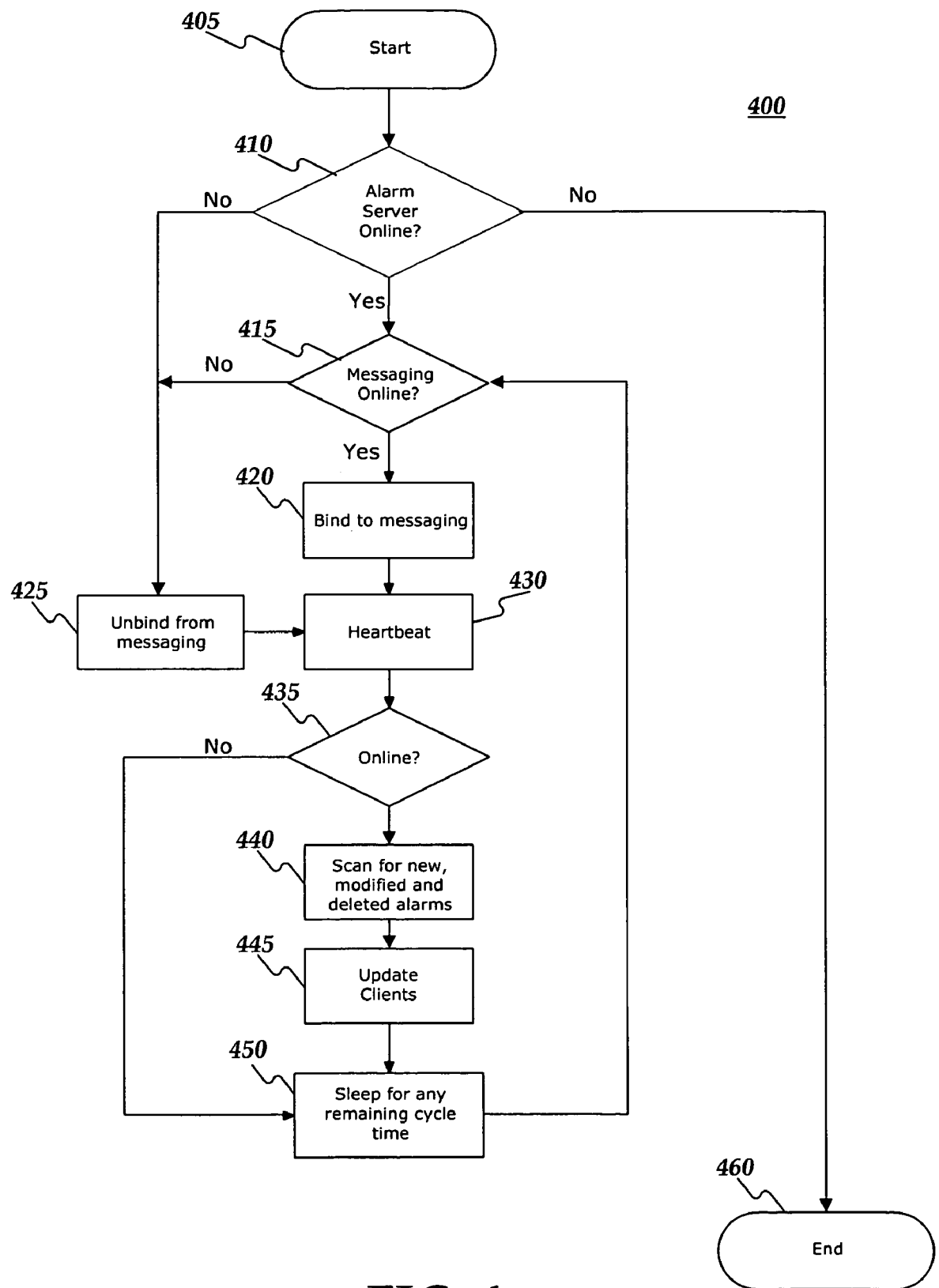
FIG. 4 is a flow chart of a method for providing alarms to clients.

FIG. 4 is a flow chart of a method 400 for providing alarms to clients. Central alarm server 105 may cause method 400 to begin at stage 405 and proceed to stage 410, where central alarm server 105 may determine the online status of adaptor 302. If the adaptor is offline, method 400 may end at stage 460. Otherwise, method 400 may proceed to stage 415, where central alarm server 105 may determine whether a messaging subsystem is online. For example, central alarm server 105 may determine that no clients are connected, and so no messaging system is online to send alarm messages to clients. Consistent with embodiments of the invention, central alarm server 105 may determine that each client is connected, but inactive. An inactive client may not be operating any notification modules while remaining in communication with central alarm server 105. Should a notification module be activated, the client may inform central alarm server 105 that it is now active by requesting alarms corresponding to at least one notification type. If central alarm server 105 determines that the messaging subsystem is online, method 400 may proceed to stage 420, where central alarm server 105 may bind to the messaging subsystem. If central alarm server 105 determines that the messaging subsystem for a client is offline, central alarm server 105 may proceed to stage 425 where central alarm server 105 may unbind from the messaging subsystem. Consistent with embodiments of the invention, each connected client may be associated with a messaging subsystem. The messaging subsystem for each client may be configured as part of connection manager 314 and may be offline when the associated client is not configured to receive messages and online when the associated client is configured to receive messages.

Once the messaging subsystems for each connected client are bound or unbound at stages 420 and 425, respectively, method 400 may advance to stage 430, where central alarm server 105 may process a heartbeat. For example, central alarm server 105 may awaken a notification thread every 50 ms.

After processing a heartbeat at stage 430, method 400 may advance to stage 435 where central alarm server 105 may confirm that alarm monitoring system 300 is online and active to process alarm messages. If not, method 400 may proceed to stage 450, where method 400 may instruct central alarm server 105 to sleep for any remaining cycle time before the next heartbeat.

If, at stage 435, central alarm server 105 determines that alarm monitoring system 300 is online, method 400 may advance to stage 440, where central alarm server 105 may scan for new, modified, and/or deleted alarms. Central alarm server 105 may be responsible for determining which of the new, modified, and/or deleted alarms may be sent to each client. For example, Adaptor 302 may construct a list of changes between alarm database 304 and local alarm cache 306 each cycle by looping through all the alarms in alarm database 304 and comparing each alarm record.

Once central alarm server 105 determines which records have changed, method 400 may advance to stage 445, where central alarm server 105 may update each client. Central alarm server 105 may note the changed records for each client by ORing the alarm records with each client's list of modified records list. Central alarm server 105 may cycle through the client list by popping the first client off the head of client list 308, processing any notifications for the client, and then returning the client to the tail of the client list.

Consistent with embodiments of the invention, a maximum number of notifications that may be sent to each client may be based upon the client's current active/inactive state and a configured maximum for each state. For example, a default value may send 1,000 notifications at a time to active clients and 100 notifications at a time to inactive clients. Adaptor 302 may also compute a scaling factor to apply to each client's maximum notification rate. The scaling factor may reduce the number of notifications per second to a global notification rate, a configurable parameter for adaptor 302 comprising a number of notifications sent to all clients per second. The scaling factor may not reduce the number of notifications below 1 or above the maximum active/inactive size. Active and inactive clients may be configured for different maximum rates.

Consistent with further embodiments of the invention, central alarm server 105 may be configured to throttle the number of alarms sent to avoid a flood condition. For example, a large number of incoming alarms may be received during an emergency situation. Adaptor 302 may throttle an alarm message dispatch rate when a total number of notifications sent per second exceeds a configured flood threshold. While in throttling mode, adaptor 302 may prioritize alarm messages according to at least one of a client type, an alarm priority, an alarm type, a category, and an alarm source. For example, adaptor 302 may prioritize sending alarms to operator client 115 over manager client 110. Operator clients may be high priority clients that require a real-time view of the alarms, while manager clients may be all other clients that do not require real-time updates.

Adaptor 302 may maintain two lists of flags for each client. The first list may contain flags indicating which records are updated and may need to be sent to the client. The second list may contain alarms adaptor 302 has already sent to the client. The second list may be used to determine whether an updated alarm is sent as created, modified, or removed. Adaptor 302 may begin each client update by determining an index of a most recent alarm and scanning backwards for a configurable number of alarms. Any alarm records determined to have been modified as compared to the client's alarm list may be sent to the client and a flag may be set on the alarm that may indicate that the client has received the modified alarm.

Alarm monitoring environment 300 may further comprise a historical database 320. Clients may poll for alarms in historical database 320 to retrieve alarms within a specified time frame. Consistent with embodiments of the invention, clients may also poll live alarm database 304 for the specified time frame. Historical alarms may be sent to the clients in the same way as real-time alarm messages.

Operator client 115 may comprise an alarming plugin 330 including a plurality of modules such as a notification manager 332 operable to provide audible and visual alerts, a viewport 334, and at least one main window 336 operative to provide an alarm display interface. Consistent with embodiments of the invention, operator client 115 may provide multiple main windows, such as a second main window 338. The alarm display interface may provide a user with tools to interact with central alarm server 105 and/or alarm monitoring environment 300. For example, the alarm display interface may provide the user with the ability to create a new alarm, add an attachment to an alarm, add a note to an alarm, categorize an alarm, add, remove, or modify properties of an alarm, and/or send an email.

Alarming plugin 330 may maintain a local copy of received alarms as a client cache 340. As new alarms or changes to existing alarms are received from adaptor 302, client cache 340 may be updated. Alarming plugin 330 may also maintain custom filters and views.

Alarming plugin 330 may further comprise a history manager 342 that may provide polling-based historical queries. Such historical queries may only update when requested by the user. Historical data may be time frame specific and may be retrieved from history database 320.

Figure 5:
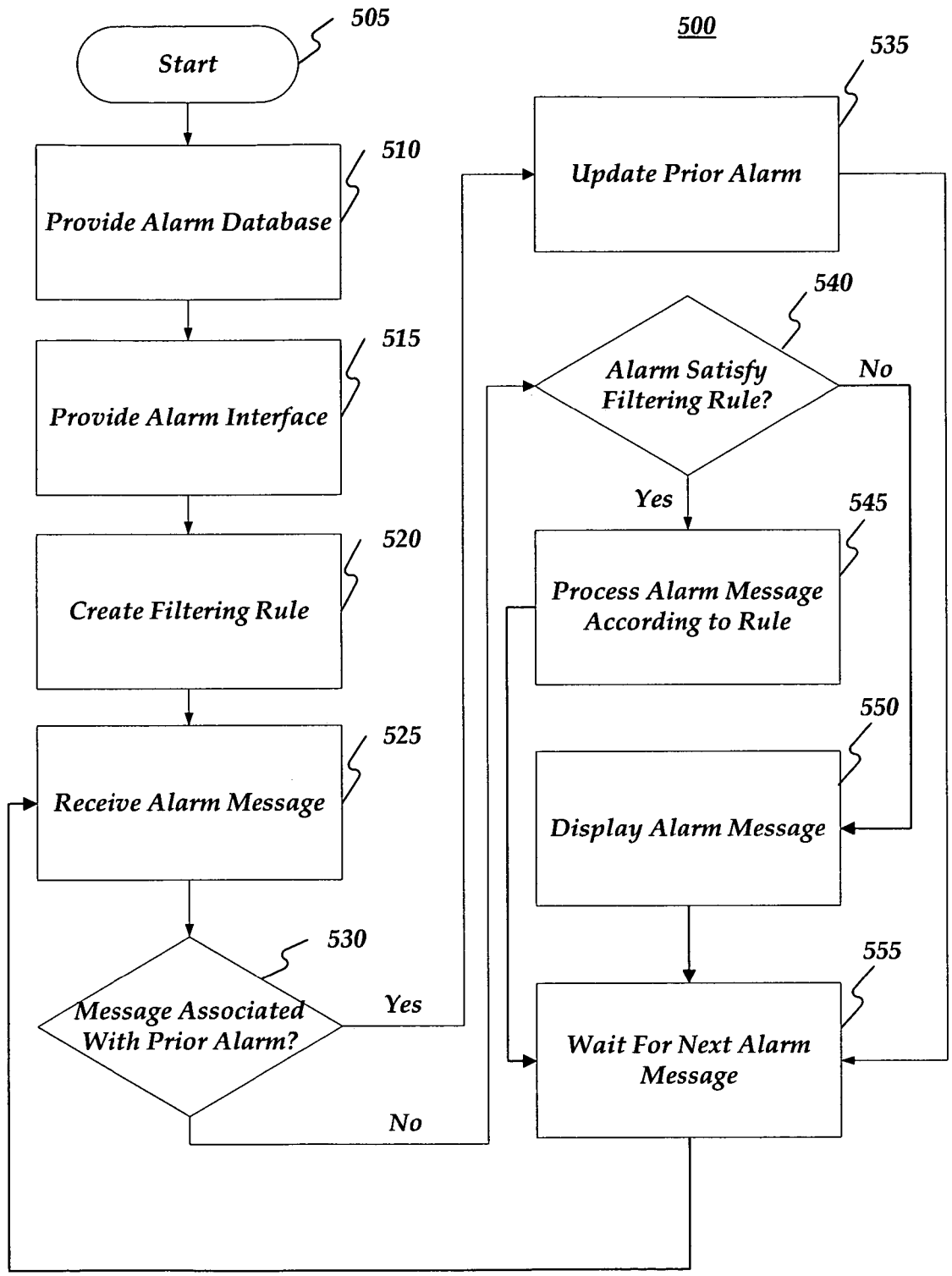
FIG. 5 is a flow chart of a method for providing holistic alarm monitoring.

FIG. 5 is a flow chart setting forth the general stages involved in a method 500 consistent with embodiments of the invention for providing holistic alarm monitoring. Method 500 may be implemented using alarm monitoring environment 300 as described in more detail above with respect to FIG. 3. Ways to implement the stages of method 500 will be described in greater detail below. Method 500 may begin at starting block 505 and proceed to stage 510 where alarm monitoring environment 300 may provide an alarm database. For example, alarm monitoring environment 300 may provide a live alarm database for storing alarm messages received from various other systems and/or monitoring stations.

From stage 510, where alarm monitoring environment 300 may provide the alarm database, method 500 may advance to stage 515 where alarm monitoring environment 300 may provide an alarm display interface. For example, alarm monitoring environment 300 may provide an alarm display interface 600, as described more fully below with respect to FIGS. 6A-6C. Consistent with embodiments of the invention alarm display interface 600 may be provided on the same computer providing the alarm database. Consistent with other embodiments of the invention, alarm display interface 600 may be provided on a client computer in communication with a server computer providing the alarm database.

Once alarm monitoring environment 300 provides the alarm display interface, method 500 may advance to stage 520 where alarm monitoring environment 300 may create at least one rule. The at least one rule may be operative to provide processing instructions for incoming alarm messages according to each alarm message's properties and may be user-specific and/or shared among multiple users and/or clients. For example, a user may create a rule for processing all alarm messages received from a particular origin station in order to move all such messages to a folder within the alarm display interface as they arrive. Consistent with embodiments of the invention, multiple properties may be evaluated and/or multiple processing steps may be taken if the properties satisfy the rule. For example, alarm monitoring environment 300 may create a rule to sound an audible alert and move the alarm message to a high priority folder if an alarm message is received from a particular origin station and the alarm message has a "critical" type property. Rules may also be used to categorize and/or prioritize incoming alarm messages.

After alarm monitoring environment 300 creates the at least one rule in stage 520, method 500 may proceed to stage 525 where alarm monitoring environment 300 may receive an alarm message. For example, as described above, operator client 115 may receive an alarm message from central alarm server 105. The alarm message may comprise information about at least one monitored system component such as systems, locations, stations, devices, and/or personnel. The alarm message may comprise a plurality of properties such as priority, origin, time/date, and/or description.

After alarm monitoring environment 300 receives the alarm message at stage 525, method 500 may proceed to stage 530 where alarm monitoring environment 300 may determine whether the alarm message is associated with at least one prior alarm. For example, alarm monitoring environment 300 may receive an alarm message with updated information about a previously received and acknowledged alarm. Consistent with embodiments of the invention, alarm monitoring environment may receive an alarm message indicating a second incident with a monitored component for which an alarm has been recently received.

If, at stage 530, alarm monitoring environment 300 determines that the alarm message is associated with at least one prior alarm, alarm monitoring environment 300 may advance to stage 535 where alarm monitoring environment 300 may update the prior alarm with the newly received information. Alarm monitoring environment 300 may then advance to stage 555 where alarm monitoring environment 300 may wait for another alarm message.

If alarm monitoring environment 300 determines that the alarm message is not associated with at least one prior alarm, method 500 may advance to stage 540, where alarm monitoring environment 300 may determine whether the alarm message satisfies one of the rules created by alarm monitoring environment 300.

If alarm monitoring environment 300 determines that the alarm message does satisfy at least one rule, method 500 may advance to stage 545, where alarm monitoring environment 300 may process the alarm message according to the satisfied rule. Processing the alarm message according to the satisfied rule may comprise at least one of: categorizing the alarm message, displaying the alarm message in the alarm display interface, providing a noise alert, and providing a visual alert. Consistent with embodiments of the invention, alarm messages may be sent and received as e-mail messages.

If, at stage 540, alarm monitoring environment 300 determines that the alarm message does not satisfy any rules, method 500 may advance to stage 550, where alarm monitoring environment 300 may handle the alarm message in a default manner, such as displaying the alarm message as a most recently received alarm message. After the alarm message has been processed either according to at least one rule at stage 545 or according to the default manner at stage 550, method 500 may advance to stage 555 where alarm monitoring environment 300 may wait for another alarm message.

Figure 6B:
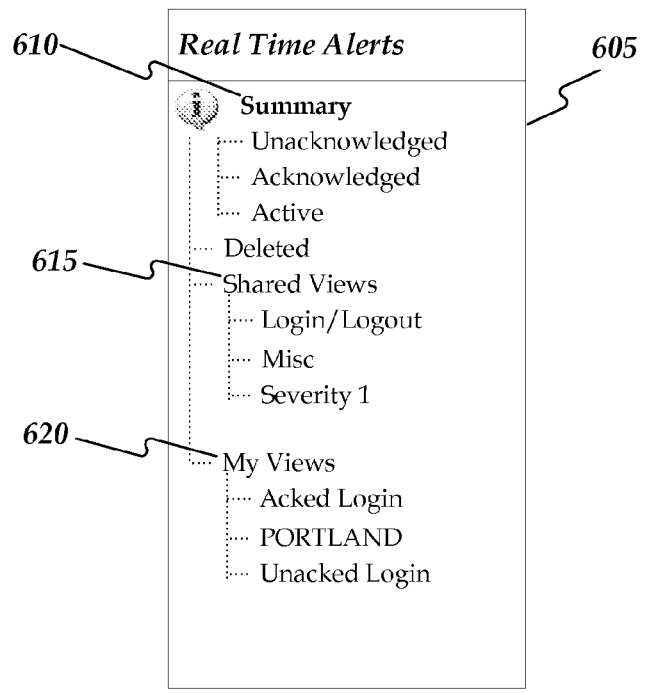
Figure 6C:
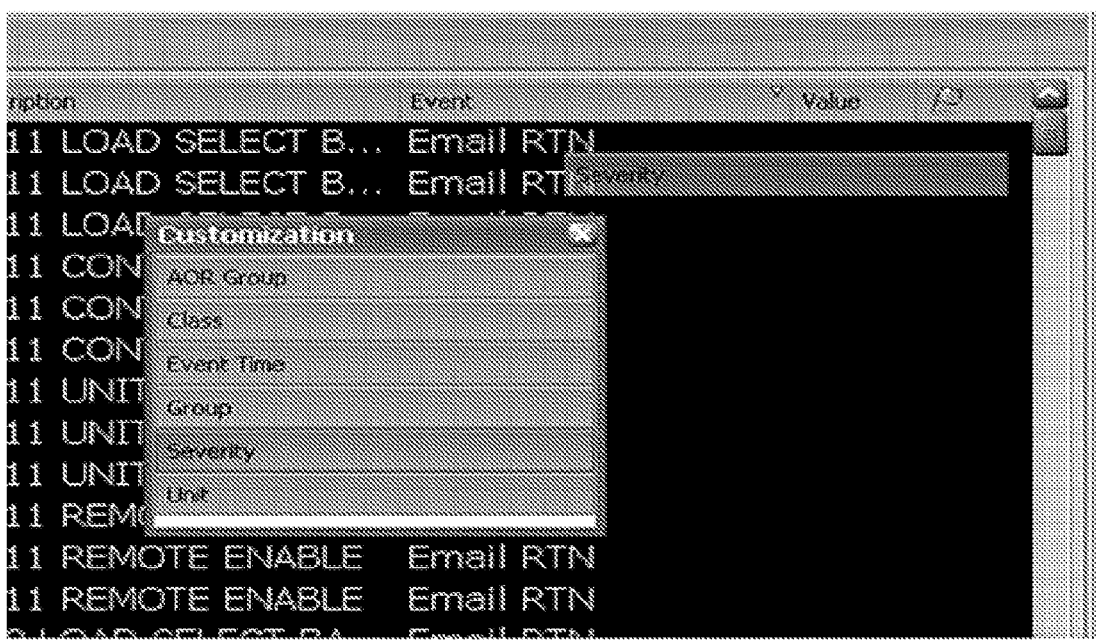

FIGS. 6A-6C are screen shots illustrating an alarm display interface 600. The alarm display interface may break up current alarms based upon the state that the alarm is in as well as more advanced custom filtering. The alarm display interface may comprise displays for unacknowledged, acknowledged, active, and/or deleted alarms and may further comprise summary and suppressed alarm displays. Displays may comprise alarm properties such as an alarm date/time, a help file indicator, a suppressor indicator, an origin, a description, an event, a value, an attachment indicator, and/or a category flag in tabular format. Further alarm characteristics such as severity, event time, group, alarm class, and value field unit of measurement may be available but hidden by default. Alarm display interface 600 may display a plurality of tabular columns, where each column is associated with a property of a received alarm message. For example, a description column 607 may be associated with a description property of an alarm message.

A user may be able to filter and/or sort the alarm messages according to at least one of the alarm properties. Changes to a default view such as user-selected filtering and/or sorting may be saved as a custom private and/or a shared view in a folder window 605. Folder window 605 may display a user-customizable list of folders and may sort views hierarchically and may include a summary view list 610, a shared view list 615, and a private view list 620. Alarm display interface 600 may provide a user the ability to easily mask out unimportant alarms and only concentrate on important high priority alarms in an emergency situation. Consistent with embodiments of the invention, alarm monitoring system 300 may recognize that an emergency situation is occurring and automatically switch to an emergency situation view. For example, alarm monitoring system 300 may be monitoring an electric company's power grid and may detect that an electrical storm is occurring. Alarm monitoring system 300 may switch to an emergency situation view that filters out alarm messages associated with origin stations known to have a full time work crew for a dispatch operator client responsible for dispatching mobile work crews. At least one default view may be provided comprising a list of alarm messages in the order received.

At least one second pre-defined view may be provided comprising an emergency situation view. Consistent with embodiments of the invention, alarm display interface 600 may switch to the emergency situation view if alarm monitoring system 300 determines that an emergency situation is in effect. Alarm monitoring system 300 may determine that the emergency situation is in effect according to a received alarm message, an analysis of alarm message traffic, and/or a user input.

Alarm display interface 600 may allow a user to add notes and attachments to alarm messages. For example, a user may attach a post operational report to an alarm message discussing how to address the problem identified by the alarm message. If another alarm message is later received and determined to be associated with the alarm message with the attachment, as discussed above with respect to stages 530 and 535 of method 500, alarm display interface 600 may make the attachment easily accessible.

A user may be able to pause the alarm display interface to prevent any new alarms matching the current filter or changes to alarms from being shown. A visual indication such as a blinking background or button may be provided when paused and the user may be allowed to unpause at any time. Consistent with embodiments of the invention, the alarm display interface may automatically unpause after a configurable timeout. Consistent with further embodiments of the invention, the user may pause first main window 336 while second main window 338 continues to update in real time.

FIG. 6C illustrates dragging an alarm message property from a list of available alarm properties to alarm display interface 600. Consistent with embodiments of the invention, users may dynamically change views by adding, removing, and/or re-arranging data fields and parameters using drag and drop functionality. These changes may be saved as views, as described above.

Consistent with embodiments of the invention, the alarm display interface allows a user to search and display alarms using the same options as building rules. For example, a user may search for all received alarms from a particular origin that have a file attachment and the alarm display interface will display the matching alarms in a currently selected view. Further consistent with embodiments of the invention, a set of search criteria may be associated with a process to undertake and be saved as a new and/or modified rule to be applied to incoming alarm messages.

Figure 7:
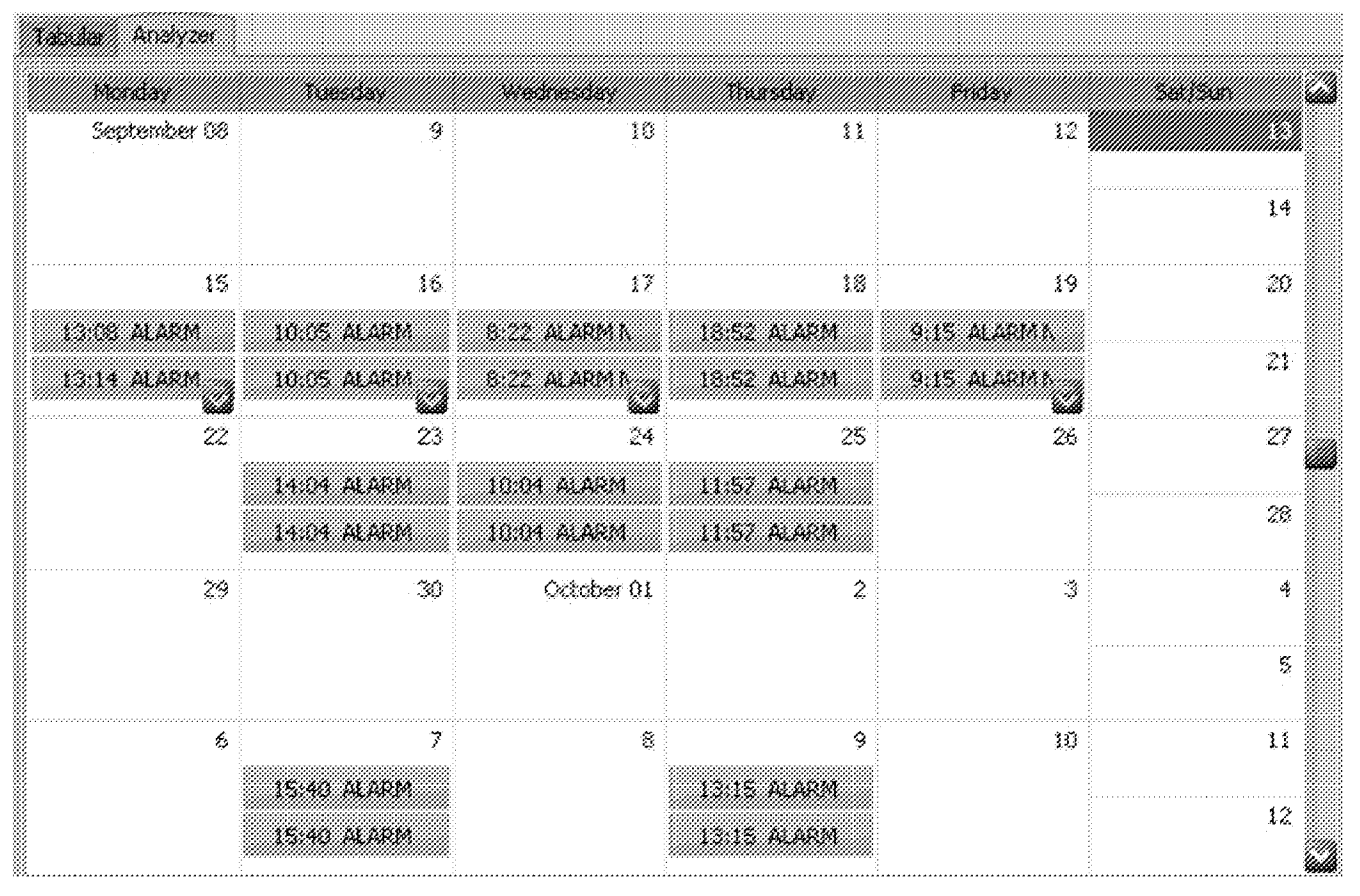

FIG. 7 is a screenshot illustrating a calendar view 700 for alarm analysis. Calendar view 700 may allow a user to select a date range of historical alarms to pull from alarm database 304 and/or historical database 320. Calendar view 700 may support filtering, searching and/or sorting in addition to the initial date range selections. Calendar view 700 may show an alarm date/time, origin, description, event, property value, attachment indicator and/or flag. A severity, group, and/or alarm class may be available but hidden by default. Alarms may be sorted by descending date/time by default. The user may open an alarm detail dialog by double clicking the alarm or using buttons in a menu or tool bar. The detail dialog may show all relevant information about the alarm including the properties mentioned above as well as a record number and key. The detail dialog may hide any fields not available for a historical alarm.

Calendar view 700 may allow the user to access any alarm attachments and/or annotations or change some and/or all of the alarm's properties. A user may flag multiple alarms for the same time for detailed review. Consistent with embodiments of the invention, flagged alarms may be displayed in alarm display interface 600 according to a selected view.

Calendar view 700 may comprise an event analyzer. Users may create their historical views/filters in alarm display interface 600 and may then select event analyzer to plot that data on calendar view 700. Calendar view 700 may associate similar alarms by property to aid in trend analysis. For example, calendar view 700 may determine that several alarms occur at the same time every day and may highlight these events to call a user's attention to them. Consistent with embodiments of the invention, the event analyzer may correlate a plurality of received alarm messages to analyze and search for a pattern. For example, alarms may be correlated according to common and/or similar categories, times, and properties. The analysis may comprise displaying the correlated entries on calendar view 700, a chart, a graph, and/or a time-line view.

Alarm display interface 600 and calendar view 700 may be customizable on a system-wide, client, and/or per user basis to create a unique look and feel. For example, a user may set a custom font and wallpaper for a private view in alarm display interface 600.

An embodiment consistent with the invention may comprise a system for providing improved alarm monitoring. The system may comprise a memory storage and a processing unit coupled to the memory storage. The processing unit may be operative to provide an alarm display interface, receive alarm messages, create rules for the received messages, and process the received messages according to the rules.

Another embodiment consistent with the invention may comprise a system for providing an alarm monitoring environment. The system may comprise a memory storage and a processing unit coupled to the memory storage. The processing unit may be operative to receive alarm messages from monitored components and dispatch alarm messages to appropriate clients. A second system, communicatively connected to the first system by a network, may comprise a second memory storage and a second processing unit coupled to the second memory storage. The second processing unit may be operative to receive the dispatched alarm messages, process the messages according to rules, and display the alarm messages.

Yet another embodiment consistent with the invention may comprise a system for providing holistic alarm monitoring. The system may comprise a memory storage and a processing unit coupled to the memory storage. The processing unit may be operative to receive and store alarm messages, associate received alarm messages with previously received alarm messages that share at least one property, and process alarm messages according to rules.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing improved alarm monitoring, the method comprising:
   providing an alarm display interface;
   receiving at least one alarm message;
   creating at least one rule for the alarm display interface;
   determining whether the at least one alarm message satisfies the at least one rule; and
   in response to determining that the at least one alarm message satisfies the at least one rule, processing the at least one alarm message according to the at least one rule
   providing a displayed list of folders for storing the at least one alarm message, wherein the displayed list of folders is customizable on a per user basis.

2. The method of claim 1, wherein processing the at least one alarm message comprises displaying the at least one alarm message in the alarm display interface.

3. The method of claim 1, wherein receiving the at least one alarm message comprises receiving an e-mail message comprising a plurality of properties associated with the at least one alarm message.

4. The method of claim 1, further comprising:
   displaying a plurality of property columns, wherein the plurality of property columns comprises a set of columns associated with a plurality of properties associated with the alarm message;
   providing at least one pre-defined view configured to display the at least one alarm message.

5. The method of claim 4, further comprising receiving at least one change associated with at least one user to the at least one pre-defined view.

6. The method of claim 5, wherein the at least one user change to the at least one pre-defined view comprises at least one of: displaying a plurality of received alarm messages sorted by at least one of the plurality of property columns, selecting of a subset of the plurality of property columns to display, filtering a display of a plurality of received alarm messages according to at least one search criteria, and displaying a plurality of received alarm messages according to at least one category of each of the plurality of received alarm messages.

7. The method of claim 4, further comprising:

providing at least one second pre-defined view, wherein the at least one second pre-defined view comprises an emergency situation view;

determining whether the emergency situation is in effect; and in response to determining that the emergency situation is in effect, changing the alarm display interface to the at least one second pre-defined view.

8. The method of claim 1, further comprising categorizing the received alarm message.

9. The method of claim 8, further comprising moving the received alarm message to a folder according to the at least one rule, wherein the at least one rule comprises a category-based rule and the received alarm message satisfies the category-based rule.

10. The computer-readable medium of claim 1, further comprising:

providing a user interface element in the alarm display interface configured to receive at least one search criteria; and Receiving the at least one search criteria.

11. The computer-readable medium of claim 10, further comprising:

searching a plurality of received alarm messages; and displaying at least a subset of the plurality of received alarm messages matching the search criteria.

12. The method of claim 1, further comprising:

receiving, for the at least one alarm message, a user comment comprising at least one of: an annotation and a file attachment; and associating the at least one user comment with the at least one alarm message.

13. The method of claim 12, further comprising:

receiving at least one second alarm message, wherein the at least one second alarm message comprises at least one property in common with the at least one alarm message associated with the at least one user comment;

displaying the at least one second alarm message and the at least one alarm message associated with the at least one user comment; and indicating that the at least one user comment is available for review.

14. The method of claim 1, further comprising:

receiving a plurality of alarm messages;

correlating the plurality of alarm messages according to at least one of: a time of each of the plurality of alarm messages, a category of each of the plurality of alarm messages, a priority of each of the plurality of alarm messages, and at least one property of each of the plurality of alarm messages; and analyzing the correlated plurality of alarm messages to search for at least one pattern.

15. The method of claim 14, wherein analyzing the correlated plurality of alarm messages comprises displaying at least one of a calendar and a time-line view of the correlated plurality of alarm messages.

16. A system for providing improved alarm monitoring, the system comprising:

a memory storage; and a processing unit coupled to the memory storage, wherein the processing unit is operative to:

provide an alarm display interface;

receive a plurality of alarm messages;

create at least one rule for the alarm display interface, wherein the at least one rule comprises a rule operative to filter the plurality of alarm messages for display;

determine whether at least one of the plurality of received alarm messages satisfies the at least one rule;

in response to determining that the at least one of the plurality of received alarm messages satisfies the at least one rule, process the at least one of the plurality of received alarm messages according to the at least one rule;

provide a displayed list of folders for storing the at least one of the plurality of received alarm messages, wherein the displayed list of folders is customizable on a per user basis.

17. The system of claim 16, wherein the system comprises one of a plurality of client systems configured to receive alarm messages from an alarm dispatch server.

18. The system of claim 17, wherein the alarm dispatch server is operative to:

determine whether a number of alarms to be dispatched exceeds a flood threshold; and in response to determining that the number of alarms to be dispatched exceeds the flood threshold, throttle a dispatch rate of the alarms to be dispatched, wherein being operative to throttle the dispatch rate comprises being operative to prioritize the alarms to be dispatched according to at least one of: a category of each of the alarms to be dispatched and a type of each of the plurality of client systems.

19. The system of claim 15, wherein being operative to process the at least one of the plurality of received alarm messages according to the at least one rule comprises being operative to process the at least one of the plurality of received alarm messages according to at least one of: display the at least one of the plurality of received alarm messages, move the at least one of the plurality of received alarm messages to a folder, provide an audible signal, provide a visual signal within the alarm display interface, and provide an alert window separate from the alarm display interface.

20. A computer-readable medium which stores a set of instructions which when executed performs a method for providing improved alarm monitoring, the method executed by the set of instructions comprising:

providing an alarm database for storing a plurality of previously received alarm messages;

receiving at least one alarm message;

providing a displayed list of folders for storing the at least one alarm message, wherein the displayed list of folders is customizable on a per user basis determining whether the at least one received alarm message is associated with at least one of the previously received alarm messages;

in response to determining that the at least one received alarm message is associated with the at least one of the previously received alarm messages, updating the at least one of the previously received alarm messages; and in response to determining that the at least one received alarm message is not associated with the at least one of the previously received alarm messages:
   adding the at least one received alarm message to the alarm database,
   determining whether the at least one received alarm message satisfies at least one rule, and in response to determining that the at least one received alarm message satisfies the at least one rule, process the at least one received alarm message according to the at least one rule.

* * * * *